United States Patent
Ho et al.

(10) Patent No.: US 11,227,233 B1
(45) Date of Patent: Jan. 18, 2022

(54) MACHINE LEARNING SUGGESTED ARTICLES FOR A USER

(71) Applicants: Nhung Ho, Redwood City, CA (US); Meng Chen, Sunnyvale, CA (US); Heather Simpson, Sunnyvale, CA (US); Xiangling Meng, Mountain View, CA (US)

(72) Inventors: Nhung Ho, Redwood City, CA (US); Meng Chen, Sunnyvale, CA (US); Heather Simpson, Sunnyvale, CA (US); Xiangling Meng, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 560 days.

(21) Appl. No.: 16/207,043

(22) Filed: Nov. 30, 2018

Related U.S. Application Data (60) Provisional application No. 62/695,638, filed on Jul. 9, 2018.

(51) Int. Cl.
*G06F 3/048* (2013.01)
*G06N 20/00* (2019.01)
*G06F 9/451* (2018.01)
*G06F 16/903* (2019.01)

(52) U.S. Cl.
CPC ............ *G06N 20/00* (2019.01); *G06F 9/453* (2018.02); *G06F 16/90344* (2019.01)

(58) Field of Classification Search
CPC .... G06F 16/90344; G06F 9/453; G06N 20/00
See application file for complete search history.

(56) References Cited

U.S. PATENT DOCUMENTS

| | | | | |
|---|---|---|---|---|
| 8,390,584 B1* | 3/2013 | Bhojan | ................. | G06F 3/0488 345/173 |
| 8,762,326 B1* | 6/2014 | Zhou | ................... | G06F 16/9535 707/609 |
| 9,530,160 B2* | 12/2016 | Lau | ......................... | G06Q 50/01 |
| 9,940,394 B1* | 4/2018 | Grant | ..................... | H04L 51/08 |
| 10,049,664 B1* | 8/2018 | Indyk | ..................... | H04L 67/22 |
| 10,366,431 B1* | 7/2019 | Shah | ..................... | H04L 67/141 |
| 10,552,843 B1* | 2/2020 | Podgorny | ........... | G06F 16/3329 |
| 2001/0013047 A1* | 8/2001 | Marques | ............ | G06F 16/9535 |
| 2017/0262447 A1* | 9/2017 | Paulsen | ................... | H04L 67/00 |
| 2018/0121539 A1* | 5/2018 | Ciulla | ................. | G06F 16/3344 |
| 2019/0286890 A1* | 9/2019 | Khanna | ................. | G06F 16/337 |

* cited by examiner

*Primary Examiner* — Rashawn N Tillery
(74) *Attorney, Agent, or Firm* — Ferguson Braswell Fraser Kubasta PC (57) ABSTRACT

A method is disclosed. The method includes: obtaining a help request associated with a user operating an application and a click stream of the user within the application; generating a feature data structure based on the help request and the click stream; generating, by applying the feature data structure to a machine learning model, a topic data structure including a plurality of scores corresponding to a plurality of topics; obtaining a plurality of topic distributions corresponding to a plurality of articles; identifying, by applying the topic data structure to the plurality of topic distributions, a subset of the plurality of articles for the user; and displaying, in response to the help request, a graphical user interface (GUI) including a plurality of links to the subset of the plurality of articles.

14 Claims, 5 Drawing Sheets

Recommended Articles 420

- How do I create a recurring template and what types of templates can I create?
- Recurring Transactions do not run but the Next Date advances
- Why are my employees' Social Security Numbers (SSNs) masked?
- Monthly recurring transactions not posting
- How can we send Friendly Reminders on outstanding invoices?

Topic Data Structure 410

| topic | score |
|---|---|
| topic123_recurring:transactions:templates:create:template | 0.0702733 |
| topic120_number:change:numbers:security:social | 0.0675421 |
| topic169_invoice:send:invoices:print:reminder | 0.064879 |
| topic137_pdf:invoice:save:attach:attachments | 0.0426573 |
| topic184_invoice:create:customer:invoices:recurring | 0.0408097 |
| topic7_invoice:due:invoices:date:past | 0.0337395 |
| topic23_expenses:expense:billable:enter:invoice | 0.0312547 |
| topic69_estimates:invoice:create:estimates:quote | 0.0292091 |
| topic38_paid:deposited:invoice:status:change | 0.0248408 |
| topic161_discount:line:discounts:invoice:invoices | 0.0245832 |

MACHINE LEARNING SUGGESTED ARTICLES FOR A USER

CROSS-REFERENCE TO RELATED APPLICATIONS

This application claims priority under 35 U.S.C. § 119(e) to U.S. Provisional Patent Application Ser. No. 62/695,638, filed on Jul. 9, 2018. U.S. Provisional Patent Application Ser. No. 62/695,638 is hereby incorporated by reference in its entirety.

BACKGROUND

As software applications offer an increasing number of workflows having an increasing number of pages and tasks, it is more and more likely that users will need help navigating these workflows, pages, and tasks. However, users frequently do not know how to search for relevant articles that answer their questions about the workflows, pages, and/or tasks offered by the software applications.

SUMMARY

In general, in one aspect, one or more embodiments relate to a method. The method comprises: obtaining a help request associated with a user operating an application and a click stream of the user within the application; generating a feature data structure based on the help request and the click stream; generating, by applying the feature data structure to a machine learning model, a topic data structure comprising a plurality of scores corresponding to a plurality of topics; obtaining a plurality of topic distributions corresponding to a plurality of articles; identifying, by applying the topic data structure to the plurality of topic distributions, a subset of the plurality of articles for the user; and displaying, in response to the help request, a graphical user interface (GUI) comprising a plurality of links to the subset of the plurality of articles.

In general, in one aspect, one or more embodiments relate to a system. The system comprises: a data repository storing at least one of a plurality of topic distributions corresponding to a plurality of articles; a featurization engine that generates a feature data structure based on a click stream of a user in an application in response to a help request associated with the user; a recommendation engine that: generates, by applying the feature data structure to a machine learning model, a topic data structure comprising a plurality of scores corresponding to a plurality of topics; and identifies, by applying the topic data structure to the plurality of topic distributions, a subset of the plurality of articles for the user; and a graphical user interface (GUI) that displays a plurality of links to the subset of the plurality of articles in response to the help request.

In general, in one aspect, one or more embodiments relate to a non-transitory computer readable medium (CRM) storing instructions. The instructions, when executed by a computer processor, comprise functionality for: obtaining a help request associated with a user operating an application and a click stream of the user within the application; generating a feature data structure based on the help request and the click stream; generating, by applying the feature data structure to a machine learning model, a topic data structure comprising a plurality of scores corresponding to a plurality of topics; obtaining a plurality of topic distributions corresponding to a plurality of articles; identifying, by applying the topic data structure to the plurality of topic distributions, a subset of the plurality of articles for the user; and displaying, in response to the help request, a graphical user interface (GUI) comprising a plurality of links to the subset of the plurality of articles.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (f, any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

One or more embodiments are directed towards identifying articles to help a user in response to a user's help request within an application. In order to identify the articles, the recent tasks of the application initiated by the user and/or the recent pages of the application accessed by the user are supplied to a machine learning model. The output of the machine learning model is a topic data structure that identifies, using scores, topics that are very relevant to the user's help request and topics that are less relevant/irrelevant to the user's help request. Each article in a collection of articles is associated with its own topic distribution. The topic distribution of an article identifies one or more topics which are discussed in or associated with the article. The topic distribution of each article and the topic data structure from the machine learning model are used to identify a subset of articles particularly relevant to the user's help request. Links to this subset of articles is displayed to the user in response to the help request.

Figure 1:
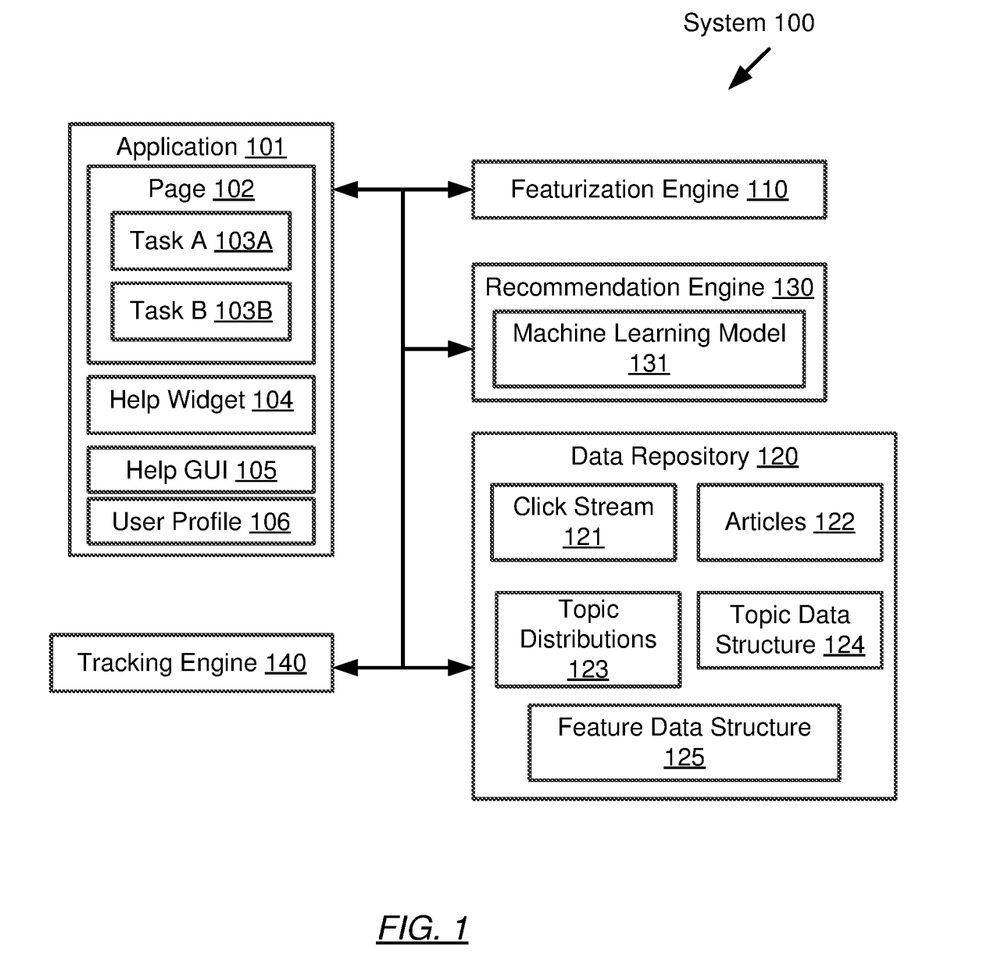
FIG. 1 shows a system in accordance with one or more embodiments.

FIG. 1 shows a block diagram of a system (100) in accordance with one or more embodiments. As shown in FIG. 1, the system (100) has multiple components including an application (101), a featurization engine (110), a recommendation engine (130), a tracking engine (140), and a data repository (120). Each one of these components (101, 110, 120, 130, 140) may execute on the same computing device (e.g., a server, a personal computer (PC), a smart phone, a tablet PC, a mainframe, etc.) or on different computing devices connected by one or more computer networks having wired and/or wireless segments. In some embodiments, one or more of the tracking engine (140), the featurization engine (110), and the recommendation engine (130) are internal components of the application (101). Each of these components (101, 110, 120, 130, 140) is described below.

In one or more embodiments, the application (101) is any type of software application operated by one or more users. For example, the application (101) may be a word processing application, a financial management application (e.g., accounting software, tax return preparation software, budgeting software, inventory management software, payroll management software), an image or video editing application, an integrated development environment (IDE), etc. In one or more embodiments, the application (101) includes a user profile (106) for each user. The user profile may store information regarding the user including, for example, preferred language, financial products and financial software applications owned or utilized by the user, how long (e.g., in days) the user has subscribed to the application (101), interests specified by the user when the user signed up for the application (101), how the user subscribed to the application (101) (e.g., wholesale, retail, from trailers, buy now, etc.), whether the user migrated from another financial product (e.g., accounting software, tax return preparation software, etc.), etc.

In one or more embodiments, the application (101) offers multiple workflows each having one or more pages (e.g., page (102)) that are accessible to the user to perform one or more tasks (e.g., task A (103A), task B (103B), etc.). For example, if the application (101) is a financial management application, the workflows may correspond to banking, vendors, customers, etc. Moreover, the tasks may correspond to creating invoices, creating expenses, creating checks, creating vendor credit, creating sale receipts, making deposits, paying bills, creating estimates, etc. There may be hundreds of tasks and/or pages and each task and each page may have a unique numerical or alphanumerical identification (ID).

In one or more embodiments, the application (101) includes a help widget (104). The help widget (104) may be activated by the user when the user is having difficulty performing a task (103A, 103B). A help request is triggered when the user activates the help widget (104). The help widget (104) may correspond to a button or menu item visible on the page (102).

In one or more embodiments, the application (101) also has a help graphical user interface (GUI) (105). The help GUI (105) may be displayed in response to the help request. Moreover, the help GUI (105) may include links to recommended articles (discussed below) that are relevant in solving the user's problem in performing the task (103A, 103B). In addition, the help GUI (105) may also include an online help manual or guide, a search widget (e.g., textbox) for search queries, frequently asked questions (FAQs) with answers, a listing of topics, etc. In one or more embodiments, the links to the recommended articles are displayed before the user enters a search query in the search widget. In other words, the user does not need to provide a search query for the links to be displayed.

In one or more embodiments, the tracking engine (140) tracks and logs the user's navigation/progress within the application (101). For example, the tracking engine (140) may correspond to an event listener that reacts to input received from the user through a keyboard, mouse, touchscreen, voice commands, etc. In one or more embodiments, the tracking engine (140) generates a click stream (121) that includes the task IDs of the tasks (103A, 103B) executed by the user or at least initiated by the user. The click stream (121) may also include the page IDs of pages (e.g., page (102)) accessed by the user. In one or more embodiments, the task IDs and page IDs within the click stream (121) are arranged as one or more ordered lists. The click stream (121) may have multiple instances of the same task ID if the corresponding task is performed or initiated multiple times by the user. Similarly, the click stream (121) may have multiple instances of the same page ID if the corresponding page is accessed multiple times by the user. Additionally, the click stream (121) may also include an ID associated with the user and/or timestamps corresponding to the user's session with the application (101).

In one or more embodiments, the featurization engine (110) generates a feature data structure (125) based on the click stream (121) and/or the user profile (106). Generation of the feature data structure (125) may be triggered by the help request. The feature data structure (125) may have multiple entries and each entry may correspond to one of the tasks of the application (101) or one of the pages of the application. For example, if the application (101) has N possible tasks and K possible pages, the feature data structure (125) may have at least N+K entries. The feature data structure (125) may be an array, a vector, a list, or any other type of data structure. The featurization engine (110) populates the feature data structure (125) based on data in the click stream (121) and/or user profile (106) (discussed below).

In one or more embodiments of the invention, the data repository (120) is any type of storage unit and/or device (e.g., a file system, database, collection of tables, or any other storage mechanism) for storing data. Further, the data repository (120) may include multiple different storage units and/or devices. The multiple different storage units and/or devices might or might not be of the same type or located at the same physical site.

In one or more embodiments, the data repository (120) stores multiple articles (122). Each of the articles (122) may correspond to a webpage, a word document, a PDF document, a blog, a social media page, a newsfeed, etc. Moreover, each article (122) may correspond to one or more of the workflows, pages, and/or tasks of the application (101). In other words, the content of the articles (122) may provide help to users operating the application (101).

In one or more embodiments, the data repository (120) stores one or more topic distributions (123). Each of the topic distribution corresponds to one of the articles (122). Further, each topic distribution provides various probabilities (or other numerical values) that the corresponding article is relevant to one or more topics within a set of topics. For example, assume there are M topics. A topic distribution may have M entries corresponding to the M topics. Moreover, assume entry 1 and entry 2 in the topic distribution corresponds to topic 1 and topic 2, respectively. Entry 1 stores a probability that the article is relevant to topic 1. Entry 2 stores a probability that the article is relevant to topic 2. In one or more embodiments, if an entry stores a zero, the article has no relevance to the topic associated with the entry. Each of the topic distributions (123) may be implemented as an array, a vector, a list, etc. In one or more embodiments, the topic distribution for an article is embedded (e.g., as metadata) within the article.

In one or more embodiments, the recommendation engine (130) generates a topic data structure (124) based on the feature data structure (125) using a machine learning model (131). Specifically, the topic data structure (124) is the output of the machine learning model (131) after consuming the feature data structure (125). As discussed above, there may be M topics. In one or more embodiments, the topic data structure (124) has M entries each corresponding to one of the M topics. Each entry stores a score reflecting the relevance of the topic to the user's help request. The machine learning model (131) is trained to calculate the scores based on the entries in the feature data structure (125). The machine learning model (131) may be any type of trained supervised or unsupervised model. For example, the machine learning model (131) may be a random forest algorithm.

In one or more embodiments, if an entry in the topic data structure (124) has a value of zero, the machine learning model (131) has determined based on the feature data structure (125) that the corresponding topic is not relevant to the user's help request. Like each of the topic distributions (123), the topic data structure (124) may also be implemented as an array, a vector, a linked list, etc. Moreover, the topic data structure (124) and each of the topic distributions (123) may have the same dimensions. For example, the topic data structure (124) and each of the topic distributions (123) may be vectors of size M.

In one or more embodiments, the recommendation engine (130) is further configured to identify a subset of the articles (122) that are relevant to the user's help request in the application (101). In one or more embodiments, the subset is identified by calculating a dot product between the topic data structure (124) and each of the topic distributions (123). The articles associated with dot products equal to or in excess of a relevance threshold may correspond to the subset. Additionally or alternatively, the subset may correspond to the articles with the top D highest dot products (e.g., D=5). The help GUI (105) may include links to this subset of articles. The use of the feature data structure (125), the machine learning model (131), the topic data structure (124), the topic distributions (123), and the dot product operation results in refined search results pertinent to the user's help request. This is a technical improvement to at least the technical field of online searching and online help.

While FIG. 1 shows a configuration of components, other configurations may be used without departing from the scope of the invention. For example, various components may be combined to create a single component. As another example, the functionality performed by a single component may be performed by two or more components.

Figure 2:
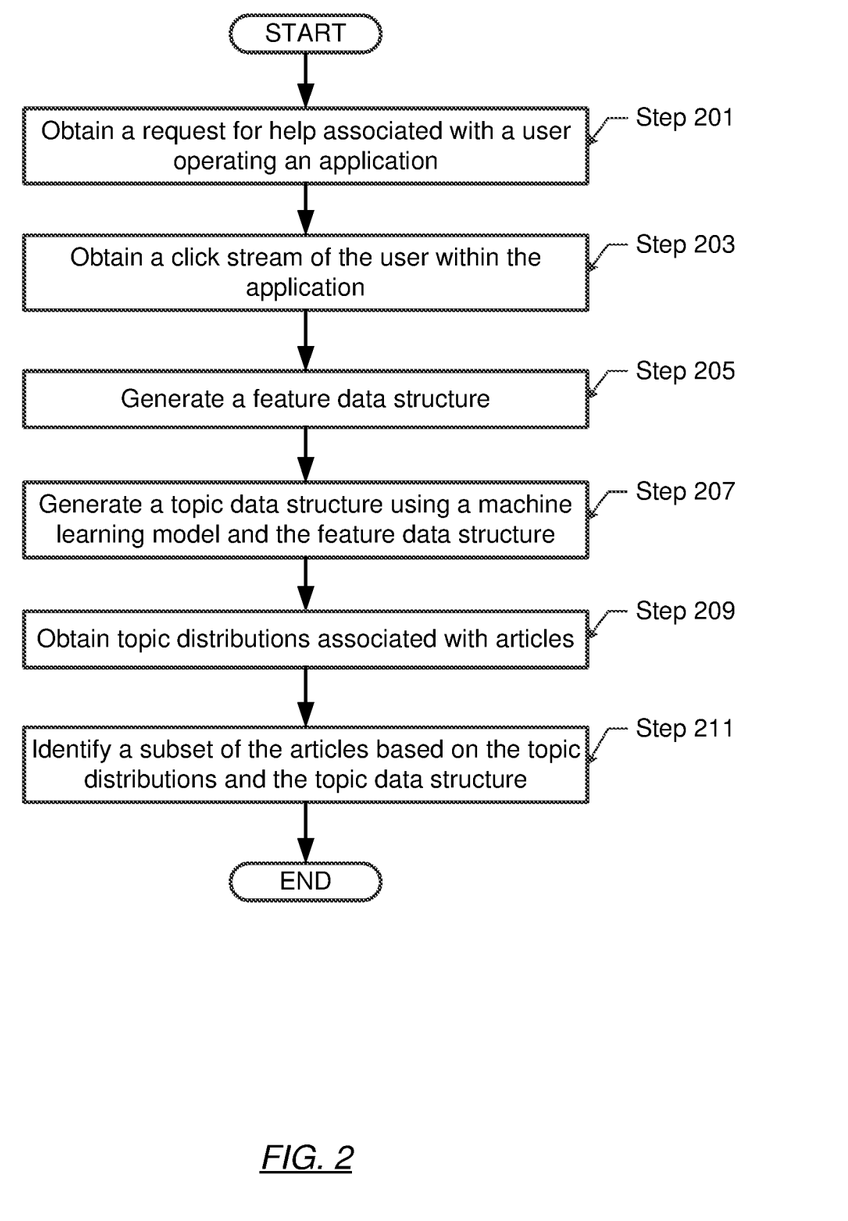
FIG. 2 shows a flowchart in accordance with one or more embodiments.

FIG. 2 shows a flowchart depicting a method associated with suggesting articles for a user using machine learning. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. One or more steps in FIG. 2 may be performed by the components of the system (100) (e.g., the application (101), the tracking engine (140), the featurization engine (110), the recommendation engine (130)).

In Step 201, a user request for help is obtained. The help request may be generated in response to the user activating a help widget within an application. Prior to the user activating the help widget (e.g., help button, menu item), the user may have been accessing one or more pages of the application and/or attempting to perform one or more tasks in the application.

In Step 203, the click stream of the user is obtained. The click stream may include one or more lists with the IDs of all the tasks initiated by the user prior to activating the help widget. The click stream may also include the IDs of all the pages accessed by the user prior to activating the help widget. The one or more lists may be ordered showing the sequence in which pages were accessed and tasks were initiated. Multiple instances of the same ID may appear in the list(s) if the user accessed a page multiple times and/or if the user initiated a task multiple times.

In Step 205, a feature data structure is generated based on the click stream and/or a user profile of the user in the application. The feature data structure has multiple entries. The feature data structure may have one entry for every possible task in the application and one entry for every possible page in the application. For example, if the application has N possible tasks and K possible pages, the feature data structure may have at least N+K entries. In addition, the feature data structure may multiple entries for the attributes in the user profile. For example, the feature data structure may include entries specifying how long (e.g., in days) the user has subscribed to the application, interests specified by the user when the user signed up for the application (101), how the user subscribed to the application (101) (e.g., wholesale, retail, from trailers, buy now, etc.), whether the user migrated from another financial product (e.g., accounting software, tax return preparation software, etc.) etc. The feature data structure may correspond to a list, an array, a vector, etc.

In one or more embodiments, counts are determined from the click stream and at least some entries in the feature data structure are populated with the counts. A count may refer to the frequency of a task ID or a page ID in the click stream. For example, if the task ID "274" appears three times in the click stream, then the entry in the feature data structure corresponding to the task with task ID "274" is populated with the count of 3. Similarly, if the task ID "399" appears twice in the click stream, then the entry in the feature data structure corresponding to the task with task ID "399" is populated with the count of 2. As yet another example, if the click stream does not have any instances of task ID "107," then the entry in the feature data structure corresponding to the task with task ID "107" is populated with the count of 0. As yet another example, a sequence of task IDs may be listed as "274, 274, 274, 399, 399, 107, 274, 107". In this example, the consecutive duplicates may be removed to reduce the weight of consecutive clicks by a user. The removal of the consecutive duplicates results in a sequence of task IDs listed as "274, 399, 107, 274, 107". The corresponding count may read as "274" twice, "399" once, and "107" twice. A similar process may be executed for entries associated with pages and the page IDs in the click stream.

In one or more embodiments, one or more of the counts may be artificially increased. For example, the count associated with the last task initiated before the help widget was activated may be increased by 1, 2, 5, 7, etc. Similarly, the count associated with the last page accessed before the help widget was activated may be increased. In one or more embodiments, this last task and/or last page are highly relevant to the help the user is seeking. Artificially increasing these counts ensures this task and this page play a larger role in predicting the topic(s) relevant to the user's help request. By artificially increasing these counts, it is more likely that the machine learning model will determine topics relevant to the user's help request. This is a technical improvement to at least the technical fields of online searching and online help.

In Step 207, a topic data structure is generated based on the feature data structure. Specifically, the topic data structure is generated by a machine learning model in response to consuming the feature data structure. The machine learning model may be a random forest algorithm. The topic data structure has multiple entries and each entry corresponds to a topic. As discussed above, there may be M topics. In one or more embodiments, the topic data structure (124) has M entries each corresponding to one of the M topics. Each entry stores a score reflecting the relevance of the topic to the user's help request. The machine learning model is trained to calculate the scores based on the entries in the feature data structure. In one or more embodiments, if an entry has a score of zero, the machine learning model has predicted that the corresponding topic is not relevant to the user's help request.

In Step 209, topic distributions associated with articles are obtained. Each article may correspond to a webpage, a PDF document, a newsfeed, a social media page, a blog, etc. These articles may have been written by anyone at any time in the past. Each topic distribution provides various probabilities (or other numerical values) that the corresponding article is relevant to one or more topics within a set of topics. In one or more embodiments, the topic distribution for an article is embedded (e.g., as metadata) within the article.

In Step 211, a subset of the articles is identified and links to this subset of articles may be displayed in a help GUI of an application. In one or more embodiments, identifying the subset of articles includes calculating the dot product between the topic data structure and each of the topic distributions. If an article is only relevant to topics with low scores in the topic data structure, the resulting dot product will be small. If an article is relevant to topics with high scores in the topic data structure, the resulting dot product will be larger. In one or more embodiments, the subset of articles corresponds to all articles associated with a dot product equal to or in excess of a relevance threshold. Additionally or alternatively, the subset of articles correspond to the articles with the top D largest dot products (e.g., D=5). The help GUI application may display links to this subset of articles to the user activating the help widget and triggering the help request. The use of the feature data structure, the machine learning model, the topic data structure, the topic distributions and the dot product operation results in refined search results pertinent to the user's help request. This is a technical improvement to at least the technical fields of online searching and online help.

In one or more embodiments, the user may give feedback on the article in the form of a like or dislike. The feedback may be related to how pertinent the article was to the user's problem. In one or more embodiments, the feedback may be the number of views for each article over a certain predetermined period, such as a month. In one or more embodiments, the user may "like" or "dislike" an article after reading the article. In one or more embodiments, weights are applied to the articles based on the user feedback to artificially inflate or deflate one or more entries in the topic distribution associated with the article.

Figure 3:
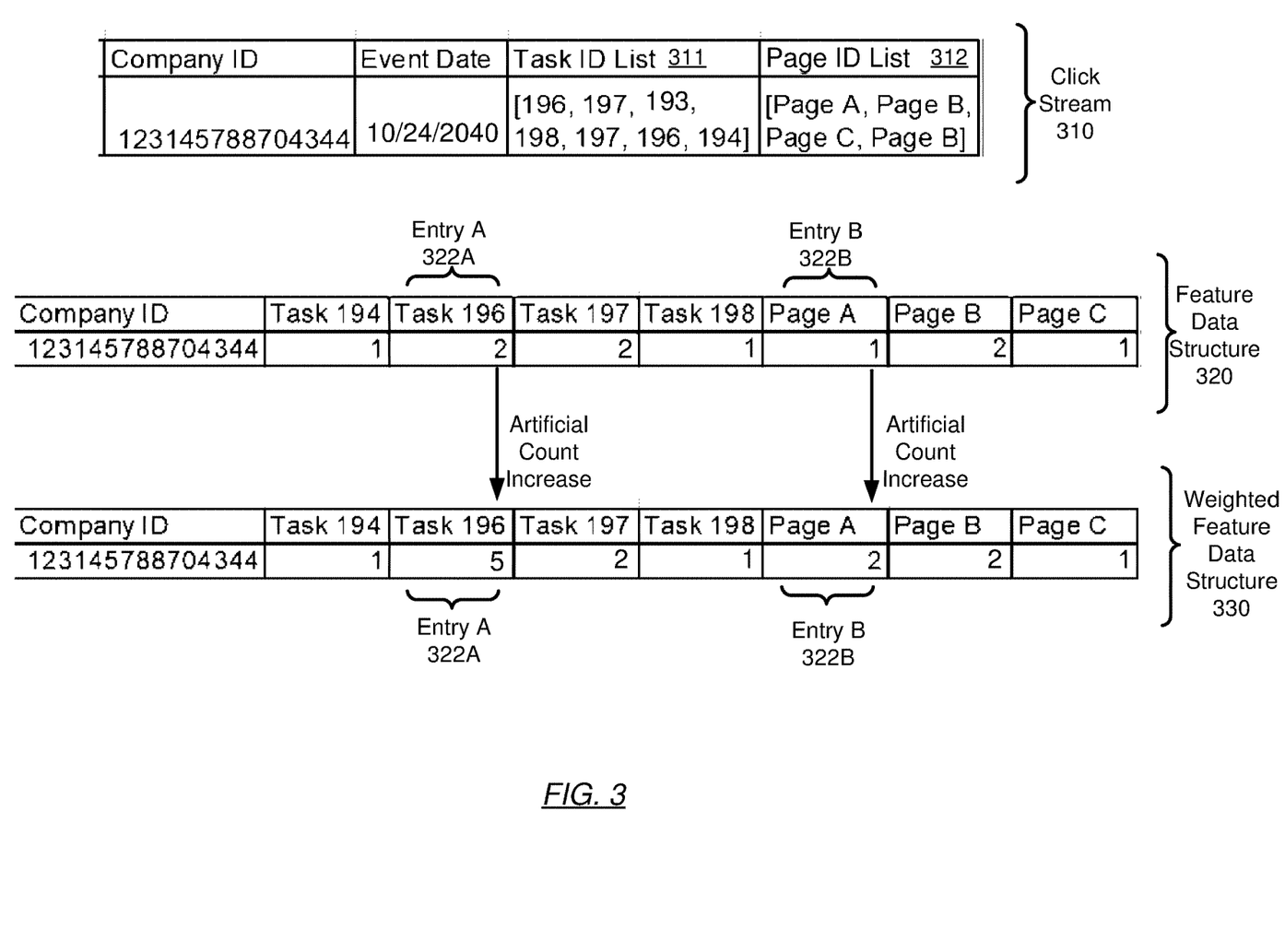
FIG. 3 and FIG. 4 show examples in accordance with one or more embodiments.

FIG. 3 shows an example in accordance with one or more embodiments. This example is for explanatory purposes only and not intended to limit the scope of the invention. As shown in FIG. 3, there exists a click stream (310). The click stream (310) includes a task ID list (311) and a page ID list (312). The task ID list (312) includes the IDs of all tasks executed or initiated by the user prior to activating the help widget. The page ID list (312) includes the IDs of all pages accessed by the user prior to activating the help widget. Both the task ID list (311) and the page ID list (312) are ordered lists. The last task initiated by the user was task 196. Other tasks initiated/executed by the user include task 197, 193, 198, and 194. The last page accessed by the user was page A. Other pages accessed by the user include page B and page C.

FIG. 3 also shows a feature data structure (320). The feature data structure (320) is generated based on the click stream (310). The feature data structure includes multiple entries including entry A (322A) and entry B (322B). Although not shown in FIG. 3, the feature data structure (320) may have a separate entry for every task in the application and a separate entry for every page in the application. Each entry associated with a task stores a count reflecting the frequency of the task in the click stream (310). For example, entry A (322A) is associated with task 196. Task 196 appears twice in the click stream (310). Accordingly, entry A (322A) stores a count of 2. As another example, entry B (322B) is associated with page A. Page A appears once in the click stream (310). Accordingly, entry B (322B) stores a count of 1.

FIG. 3 also shows a weighted feature data structure (330). The weighted feature data structure (330) is very similar to the feature data structure (320). However, one or more of the counts have been artificially increased. As shown in FIG. 3, the count in entry A (322A) corresponding to task 196 has been increased from 2 to 5. Similarly, the count in entry B (322B) corresponding to page A has been increased from 1 to 2. These increases are in response to task 196 being the last task initiated by the user and page A being the last page accessed by the user before the help widget was activated. A machine learning model will generate a topic data structure based on the weighted feature data structure (330). By artificially increasing these counts, it is more likely that the machine learning model will determine topics relevant to the user's help request. This is a technical improvement to at least the technical fields of online searching and online help.

Figure 4:
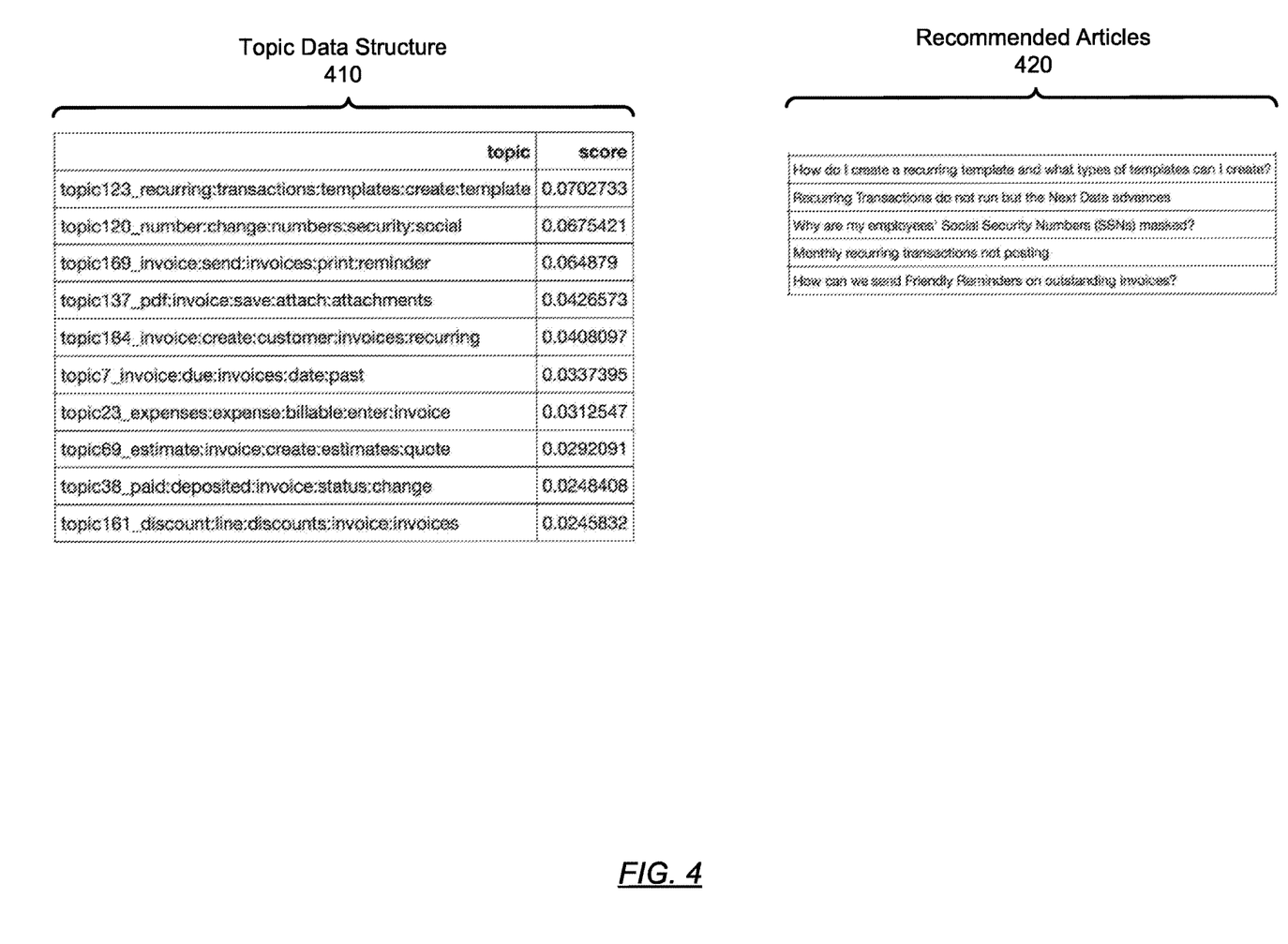

FIG. 4 shows an example in accordance with one or more embodiments. Specifically, FIG. 4 shows a topic data structure (410). The topic data structure (410) is generated by the machines learning model based on the weighted feature data structure (330). As shown, the topic data structure (410) has multiple entries and each entry corresponds to a topic. Moreover, each entry stores a score reflecting the relevance of the topic to the user's help request.

FIG. 4 also shows links to recommended articles (420). These links to recommended articles (420) may be displayed on the help GUI of the application. Moreover, these recommended articles are determined by calculating a dot product between the topic data structure (410) and each topic distribution of multiple articles (including the topic distributions of the recommended articles (420)) (not shown). The recommended articles (420) correspond to the 5 highest dot products. Additionally or alternatively, the recommended articles (420) all correspond to dot products that equal or exceed a relevance threshold.

Figure 5A:
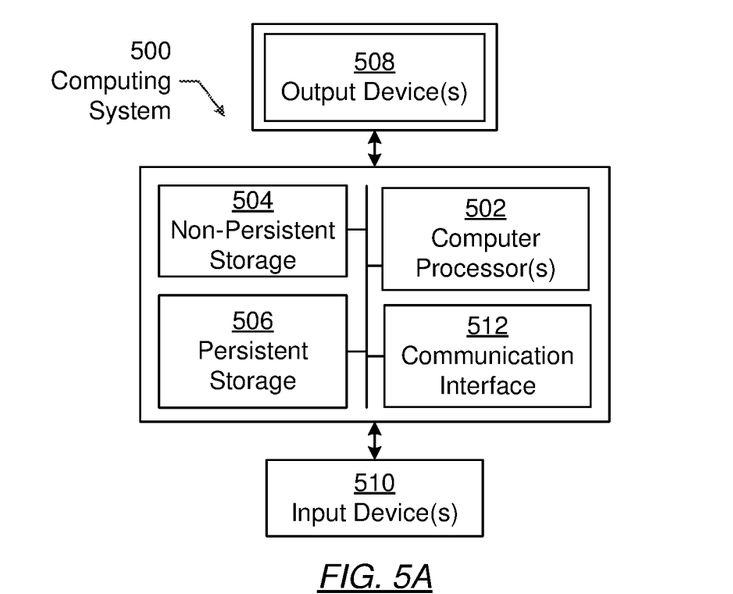
FIG. 5A and FIG. 5B show a computing system in accordance with one or more embodiments.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
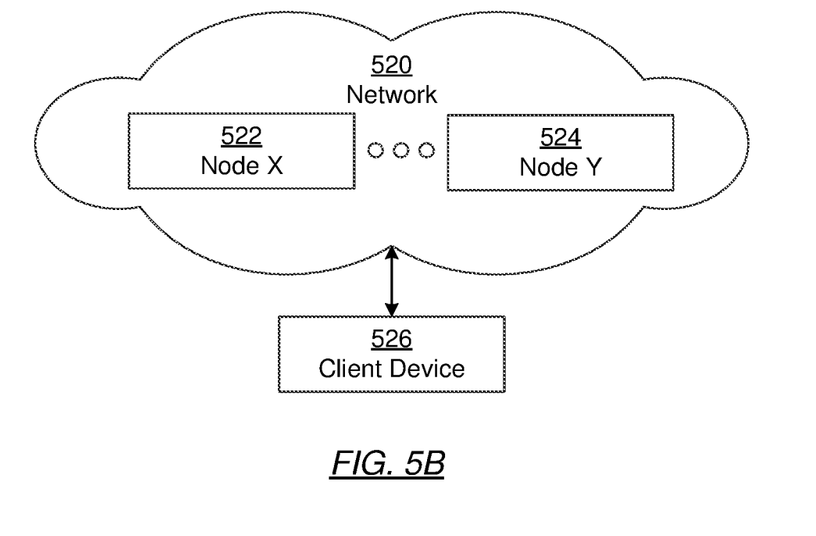

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
obtaining a help request associated with a user operating an application and a click stream of the user within the application, wherein the click stream specifies a list of pages visited by the user within the application and a list of tasks initiated by the user;
generating a feature data structure based on the help request and the click stream, wherein generating the feature data structure comprises:
calculating a count of a page within the list of pages;
calculating a count of a task within the list of tasks;
populating a first entry of the feature data structure corresponding to the page with the count of the page; and
populating a second entry of the feature data structure corresponding to the task with the count of the task;
generating, by applying the feature data structure to a machine learning model, a topic data structure comprising a plurality of scores corresponding to a plurality of topics;
obtaining a plurality of topic distributions corresponding to a plurality of articles;
identifying, by applying the topic data structure to the plurality of topic distributions, a subset of the plurality of articles for the user; and
displaying, in response to the help request, a graphical user interface (GUI) comprising a plurality of links to the subset of the plurality of articles.

2. The method of claim 1, wherein the GUI comprises a text box for search strings, and wherein the plurality of links is displayed prior to the user entering a search string into the text box.

3. The method of claim 1, further comprising:
obtaining a user profile associated with the application and identifying a financial product operated by the user,
wherein the application and the financial product are different, and
wherein the feature data structure is further based on the user profile.

4. The method of claim 1, wherein identifying the subset comprises:
calculating a plurality of dot products based on the topic data structure and the plurality of topic distributions.

5. The method of claim 1, wherein generating the feature data structure further comprises:
increasing the count of the page in response to the page being the last page in the list of pages accessed by the user before the help request was initiated; and
increasing the count of the task in response to the task being the last task in the list of tasks being initiated by the user before the help request was initiated.

6. The method of claim 1, wherein:
the application is a financial accounting application;
the feature data structure and the plurality of topic distributions are vectors; and
the machine learning model is a random forest algorithm.

7. A system, comprising:
a data repository storing at least one of a plurality of topic distributions corresponding to a plurality of articles;
a featurization engine that generates a feature data structure based on a click stream of a user in an application in response to a help request associated with the user, wherein the click stream specifies a list of pages visited by the user within the application and a list of tasks initiated by the user, and wherein generating the feature data structure comprises:
calculating a count of a page within the list of pages;
calculating a count of a task within the list of tasks;
populating a first entry of the feature data structure corresponding to the page with the count of the page; and
populating a second entry of the feature data structure corresponding to the task with the count of the task;
a recommendation engine that:
generates, by applying the feature data structure to a machine learning model, a topic data structure comprising a plurality of scores corresponding to a plurality of topics; and identifies, by applying the topic data structure to the plurality of topic distributions, a subset of the plurality of articles for the user; and a graphical user interface (GUI) that displays a plurality of links to the subset of the plurality of articles in response to the help request.

8. The system of claim 7, wherein the recommendation engine identifying the subset by:

calculating a plurality of dot products based on the topic data structure and the plurality of topic distributions.

9. The system of claim 7, wherein the featurization engine generates the feature data structure also by:

increasing the count of the page in response to the page being the last page in the list of pages accessed by the user before the help request was initiated; and increasing the count of the task in response to the task being the last task in the list of tasks being initiated by the user before the help request was initiated.

10. The system of claim 7, wherein:

the machine learning model is a random forest algorithm;

the application is a financial accounting application and comprises a user profile associated with the user and identifying a financial product operated by the user;

the application and the financial product are different;

the feature data structure is further based on the user profile;

the GUI comprises a text box for search strings; and the plurality of links is displayed prior to the user entering a search string into the text box.

11. A non-transitory computer readable medium (CRM) storing instructions that when executed by a computer processor, comprise functionality for:

obtaining a help request associated with a user operating an application and a click stream of the user within the application, wherein the click stream specifies a list of pages visited by the user within the application and a list of tasks initiated by the user;

generating a feature data structure based on the help request and the click stream, wherein generating the feature data structure comprises:

calculating a count of a page within the list of pages;

calculating a count of a task within the list of tasks;

populating a first entry of the feature data structure corresponding to the page with the count of the page; and populating a second entry of the feature data structure corresponding to the task with the count of the task;

generating, by applying the feature data structure to a machine learning model, a topic data structure comprising a plurality of scores corresponding to a plurality of topics;

obtaining a plurality of topic distributions corresponding to a plurality of articles;

identifying, by applying the topic data structure to the plurality of topic distributions, a subset of the plurality of articles for the user; and displaying, in response to the help request, a graphical user interface (GUI) comprising a plurality of links to the subset of the plurality of articles.

12. The non-transitory CRM of claim 11, wherein identifying the subset comprises:

calculating a plurality of dot products based on the topic data structure and the plurality of topic distributions; and comparing the plurality of dot products to a relevance threshold, wherein the subset of the plurality of articles corresponds to a subset of the dot products satisfying the relevance threshold.

13. The non-transitory CRM of claim 11, wherein generating the feature data structure further comprises:

increasing the count of the page in response to the page being the last page in the list of pages accessed by the user before the help request was initiated; and increasing the count of the task in response to the task being the last task in the list of tasks being initiated by the user before the help request was initiated.

14. The non-transitory CRM of claim 11, wherein:

the machine learning model is a random forest algorithm;

the application is a financial accounting application and comprises a user profile associated with the user and identifying a financial product operated by the user;

the application and the financial product are different;

the feature data structure is further based on the user profile;

the GUI comprises a text box for search strings; and the plurality of links is displayed prior to the user entering a search string into the text box.

* * * * *